United States Patent [19]

Cost

[11] Patent Number: 4,661,262

[45] Date of Patent: Apr. 28, 1987

[54] METHOD AND COMPOSITION FOR DEACTIVATION OF UNCURED PAINT

[76] Inventor: Konstantine Cost, 3614 Dukeshire, Royal Oak, Mich. 48072

[21] Appl. No.: 845,998

[22] Filed: Mar. 31, 1986

[51] Int. Cl.$^4$ .......................... C02F 1/24; B01D 47/02
[52] U.S. Cl. ........................................ 210/705; 55/84; 55/89; 210/712; 210/725; 210/728; 210/729; 252/175; 252/180; 252/181; 252/531; 252/550; 252/DIG. 8
[58] Field of Search ............... 252/175, 180, 181, 531, 252/550, DIG. 8; 210/712, 725, 728, 729; 55/84, 89

[56] References Cited

U.S. PATENT DOCUMENTS

| | | | |
|---|---|---|---|
| 2,161,122 | 6/1939 | Anderson | 55/89 |
| 2,982,723 | 5/1961 | Arnold et al. | 55/84 |
| 4,185,970 | 1/1980 | Dean | 252/160 |
| 4,297,251 | 10/1981 | Bernardino | 252/550 |
| 4,554,026 | 11/1985 | Cosper et al. | 55/84 |

*Primary Examiner*—Robert A. Wax
*Attorney, Agent, or Firm*—Cullen, Sloman, Cantor, Grauer, Scott & Rutherford

[57] ABSTRACT

The invention herein involves the capture and treatment of excess uncured paint which is produced during spray painting operations. In particular, the invention relates to alkyl sulfate-based compositions which detackify excess spray paint, a method for utilizing these compositions in paint spray booth operations and a method for removing uncured paint from coated surfaces.

15 Claims, No Drawings

METHOD AND COMPOSITION FOR DEACTIVATION OF UNCURED PAINT

BACKGROUND OF THE INVENTION

The invention herein involves the capture and treatment of excess uncured paint which is produced during spray painting operations. In particular, the invention relates to compositions which detackify excess spray paint and a process for utilizing these compositions in the environment of an industrial spray booth.

Typically, manufactured articles receive one or more coats of paint during the production process. Paint is usually applied using a paint sprayer which reduces liquid paint to minute particles and then propels these particles onto the article surface. While this method applies a thin, even coat of paint on the article, a significant amount of excess paint is also deposited on surfaces surrounding the article such as walls and floors.

In industrial settings, the paint spraying operation usually takes place inside a paint spray booth into which an article is typically carried by a conveyor belt. When the article is positioned in the booth, paint sprayers are activated to apply a coat of paint. The excess or "overspray" paint produced during the paint spraying operation adheres to the wall surfaces of the spray booth as well as on conveyor belt components and the like. During successive paint applications, layer upon layer of tarry, uncured paint accumulate on these booth surfaces. To prevent the paint build-up from interfering with the paint application process and from creating a fire hazard, the paint must be periodically removed or, alternatively, the build-up must somehow be prevented.

In order to remove the excess uncured paint build-up, the production process must be halted to allow workers to enter the paint booth with various cleaning devices to laboriously extract the layers of paint. The paint build-up is typically removed through the use of highly flammable organic solvents which may give off poisonous vapors and which often yield environmentally toxic substances. This down-time and the expense, effort and hazard associated with the use of flammable organic solvents, make their use in the paint removal process highly undesirable.

Many industrial paint booths are now equipped with devices which "capture" the paint overspray in a wall of recirculating water before the overspray can adhere to booth surfaces. These "water-walls" or "water curtains", as they are known, are placed between the article to be painted and booth surfaces so that as the paint overspray enters the sheet of circulating water, it is carried into tanks located below the spray booth. Pumps then recirculate the water through the water curtain. Although water-walls are effective in preventing significant build-up of paint on spray booth surfaces, the captured paint remains tacky in water, thus tending to coalesce and adhere to those surfaces with which it comes in contact. The paint accumulates on tank walls and other surfaces, often clogging pipes, pumps, filters and the like. Much of the paint overspray settles out of the water to the floor of the tank where it forms a layer of tarry paint sometimes several feet thick. This paint build-up in the tank must then be removed, again resulting in production down-time, clean-up expense, and the hazards associated with the use of flammable, toxic, organic solvents. While it is known to treat overspray with clays or other bulky chemicals to facilitate paint removal, none of these conventional compositions and methods have produced satisfactory results.

SUMMARY OF THE INVENTION

The invention herein provides a method and composition for detackifying or "killing" paint overspray so that the individual paint particles do not adhere to solid surfaces nor combine with one another to form sticky, tarry globules.

The method of this invention involves preparing a novel aqueous amphipathic alkyl sulfate-based solution; that is, an aqueous solution containing an alkyl sulfate which has both polar and non-polar ends separated by sufficient distance such that each end displays its own solubility characteristics, and then circulating the aqueous alkyl sulfate-based solution in a water-wall to capture, detackify, and float the paint overspray to the surface of the water in the water tank. The buoyant detackified paint particles can then be conveniently skimmed off of the water surface by conventional skimming techniques. The aqueous alkyl sulfate solution additionally contains sodium bicarbonate, an orthosilicate, or a combination of ammonium alum and potassium bicarbonate.

In another embodiment, an aqueous solution of from about 5 percent to about 30 percent by weight amphipathic alkyl sulfate is brought into contact with a layer of uncured accumulated paint on solid surfaces such as spray booth floors and paint brushes. The solution is allowed to remain in contact with the uncured paint until the paint can be removed by the application of water or by wiping off the detackified paint with a cloth or such.

It has been found that the preferred concentration of alkyl sulfate which is particularly effective in detackifying and floating paint particles in a water-wall system is in the range of from about 0.01 percent to about 0.15 percent alkyl sulfate by weight. The additional components have been found to be particularly effective in concentrations of from about 0.1 percent to about 1.0 percent by weight sodium bicarbonate or from about 0.05 percent to about 0.5 percent by weight of an orthosilicate, or from about 0.1 percent to about 0.6 percent by weight of ammonium alum and from about 0.1 percent to about 0.6 percent by weight of potassium bicarbonate. The preferred embodiment of the present invention is an aqueous solution containing from about 0.01 percent to about 0.15 percent by weight of an amphipathic alkyl sulfate and from about 0.1 percent to about 1.0 percent by weight sodium bicarbonate. It has also been found that an aqueous solution containing from about 0.01% to about 0.15% alkyl sulfate by weight and from about 0.05% to about 0.5% by weight of an orthosilicate works quite well in detackifying and floating uncured paint in a water-wall/paint booth system. It has further been found that an aqueous alkyl sulfate-based solution containing approximately 0.01 percent to about 0.15 percent by weight alkyl sulfate with about 0.1 percent to about 0.6 percent by weight ammonium alum and from about 0.1 percent to about 0.6 percent by weight potassium bicarbonate are useful herein.

It has also been found that the optional addition of sodium tripolyphosphate, tribasic sodium phosphate or anhydrous sodium metasilicate or a combination thereof to the paint-killing composition when used in a water-wall causes aluminum to settle out of metallic paints. The addition of these water treatment chemicals to the novel composition allows the aluminum particles to be collected, if desired, after they settle to the bottom of the recirculating water tank.

It is therefore an object of this invention to capture and detackify paint overspray during the spray painting operation in a paint booth so that the paint is rendered incapable of recoalescing or adhering to solid surfaces such as water tank walls, tank floors, pipes, pumps and the like and to float the detackified paint to the surface of the collection tank water. It is an object of this invention to provide an inexpensive process and composition for detackifying and floating particles of paint overspray which utilizes only non-flammable, non-corrosive, environmentally safe chemicals and which prevents the dyes or various monomeric forms of the paint formulation from forming environmentally objectionable colored compounds. It is a further object of this invention to reduce the cost of cleaning paint spray booths and their associated water tanks without creating flammable, poisonous, organic hydrocarbon wastes. It is still another object of this invention to provide a composition which detackifies layers of accumulated uncured paint on solid surfaces such as paint booth surfaces, paint sprayer surfaces, paint brushes, and other such surfaces upon which uncured paint is deposited.

DETAILED DESCRIPTION OF THE INVENTION

In accordance with the present invention, an aqueous alkyl sulfate-based solution is prepared which contains from about 0.01 percent to about 0.15 percent by weight alkyl sulfate, and from about 0.1 percent to about 1.0 percent by weight sodium bicarbonate. It has been found that from about 0.05 percent to about 0.5 percent by weight of an orthosilicate may be substituted in place of sodium bicarbonate, although sodium bicarbonate is preferred due to its excellent capacity to float the detackified paint.

Suitable alkyl sulfates include those having the formula:

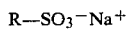

$$R-SO_3^-Na^+$$

wherein R is an alkyl group having from about eight to about eighteen carbon atoms in a straight chain. Preferred alkyl sulfates for use herein are sodium octyl sulfate, sodium decyl sulfate, sodium dodecyl sulfate, sodium tetradecyl sulfate, sodium hexadecyl sulfate, sodium octadecyl sulfate and combinations thereof. Most preferred is sodium dodecyl sulfate, which is produced under the trademarks Duponol WAQE and Duponol ME Dry by the DuPont Corporation. Suitable orthosilicates for use in the present invention will be known to those skilled in the art. Those orthosilicates which are sodium salts are preferred for use herein.

It has further been found that a mixture of ammonium alum and potassium bicarbonate may be substituted for sodium bicarbonate in the present invention. Concentrations of from about 0.1% to about 0.6% by weight of ammonium alum and from about 0.1 percent to about 0.6 percent potassium bicarbonate are acceptable and provide good detackified paint floating characteristics.

An effective volume of the alkyl sulfate-based solution is then circulated through a conventional water-wall. By effective volume, it is meant that the quantity of aqueous alkyl sulfate-based solution which is circulated is equivalent to the volume of water generally circulated through such systems. That is, the aqueous alkyl sulfate-based solution at the stated concentrations entirely replaces water in the system. As paint overspray enters the water-wall, it is captured and detackified by the alkyl sulfate-based solution. When the detackified paint is carried into the collecting tank, it floats to the top of the solution and can be conveniently removed.

It has further been found that the addition of from about 0.001 percent to about 0.01 percent by weight of a water conditioner selected from the group consisting of sodium tripolyphosphate, tribasic sodium phosphate and anhydrous sodium metasilicate to the aqueous alkyl sulfate-based solution of this invention, causes the aluminum in metallic-type paints to separate from the paint complexes and settle to the bottom of the recirculating water tank.

In another embodiment of this invention, an amphipathic alkyl sulfate having from about eight to about eighteen carbon atoms is added to water to attain a final concentration of from about 5 percent to about 30 percent alkyl sulfate by weight. This aqueous alkyl sulfate solution is then applied directly to the accumulated uncured thermosetting paint overspray by a brush or the like and allowed to set for about fifteen minutes to about twenty minutes or longer, depending on the thickness of the paint overspray. The detackified or "killed" paint is then easily removed with a rag or it can be rinsed off with water. The process may be repeated as many times as is necessary for the complete removal of paint from the surface.

It will be clear to those skilled in the art that the ingredients of the composition of this invention may be added to the water of the water-wall at any convenient location in the water circulating system which allows them to be thoroughly admixed. The paint remains detackified during disposal and will not adhere to pipes, pumps or the like. Once the killed paint is separated from the spray booth water, the water is sufficiently free from suspended paint particles to be reused in the water-wall system. Foaming caused by the turbulence of the recirculating solution can be controlled with defoamers which will be readily apparent to those skilled in the art. The killed paint may then be removed simply by skimming the paint-filled foam off of the water surface by automatic skimmers or the like. The composition of this invention may also be used as a "mask" on wall surfaces and conveyor belt surfaces by applying it directly to the surface by means of a brush or other suitable applicator. Those skilled in the art will recognize that inert carriers can be used to increase the composition's viscosity to increase its adhesion properties.

All percentages recited herein are by weight unless otherwise indicated.

While not wishing to be bound by theory, it is believed that the advantageous results of the invention are obtained because the composition of this invention induces individual paint complexes, as will be explained more fully, to enter a state of homogeneous aqueous suspension. The separation of the individual paint complexes is maintained which prevents the complexes from recoalescing into larger tarry globules.

Generally, paint consists of a mixture of a resin or other film-forming component and a pigment, uniformly dispersed in an organic solvent. The organic solvent surrounds these individual resin-pigment complexes, with a small amount of solvent entrapped in the paint complex. When paint is applied to a surface, the solvent slowly vaporizes, causing the paint complexes to "gel" into a tacky tar. The paint complexes are then held together by intermolecular forces such as dipole forces, hydrogen bonding, and dispersion forces, until fully cured.

It is theorized that this invention operates by introducing amphipathic, bipolar, alkyl sulfate molecules in aqueous solution into the paint gel. The non-polar end of the amphipathic alkyl sulfate molecules are water insoluble, or "hydrophobic", and the polar ends are water soluble, or "hydrophilic". When the aqueous alkyl sulfate solution comes in contact with the uncured paint, the non-polar ends of the alkyl sulfate molecules dissolve in the resin-pigment paint complex. The polar ends then project out, attracting a layer of water into which the polar ends dissolve, forming a shell of water which confines and separates the paint complexes from one another. The paint is thereby deactivated and can no longer adhere to solid surfaces nor recoalesce to form a tarry sludge.

It is also theorized that as the invention traps the paint complexes in water shells or "micelles", aluminum in metallic paints is freed from its position between the paint complexes. The freed metal thus sinks to the bottom of the recirculating tank. It has been found that the addition of sodium tripolyphosphate, tribasic sodium phosphate or anhydrous sodium metasilicate to the aqueous alkyl sulfate solution facilitates the precipitation of aluminum out of the killed paint suspension.

EXAMPLE I 252 gallons of an aqueous solution containing 0.1 percent by weight sodium dodecyl sulfate and 0.2 percent by weight sodium bicarbonate was prepared and the solution was thoroughly mixed by circulating it through a specially constructed water-wall. Four gallons of solvent-based, thermosetting paint of various colors were then sprayed into the water-wall containing the aqueous alkyl sulfate-based solution using a standard paint spray gun. The paint was captured in the solution and effectively killed. The sprayed paint formed a uniformly dispersed homogenate in the aqueous solution. The foaming was controlled by means of a defoamer. Killed paint floated to the top of the solution on a layer of foam and was skimmed off. White paint, yellow paint, blue metallic paint, red metallic paint and clear coat were used and all were effectively killed.

EXAMPLE II

A solid surface was coated with thermosetting paint and allowed to gel to a tacky state. A thin coat of 10 percent by weight aqueous sodium dodecyl sulfate was applied to the paint-covered surface. Twenty minutes after the sodium dodecyl sulfate solution was applied to the uncured paint, the killed paint was easily removed from the surface by wiping it with a cloth.

What is claimed is:
1. A method of detackifying uncured, solvent-based paint, which comprises:
  (a) preparing an aqueous alkyl sulfate-based solution containing from about 0.01 percent to about 0.15 percent by weight of an amphipathic alkyl sulfate having from about eight to about eighteen carbon atoms, from about 0.1 to about 0.6 percent by weight ammonium alum and from about 0.1 to about 0.6 percent by weight potassium bicarbonate;
  (b) circulating said amphipathic alkyl sulfate solution in a spray booth, water-wall; and,
  (c) capturing and detackifying said paint in said aqueous amphipathic alkyl sulfate solution circulating in said spray booth, water-wall, such that the detackified paint floats to the top of the solution.

2. The invention recited in claim 1, wherein said amphipathic alkyl sulfate solution contains from about 0.01 to about 0.15 by weight of an amphipathic alkyl sulfate and from about 0.1 percent to about 1 percent by weight of sodium bicarbonate.

3. The invention recited in claim 1, wherein said amphipathic alkyl sulfate is selected from the group consisting of sodium octyl sulfate, sodium decyl sulfate, sodium dodecyl sulfate, sodium tetradecyl sulfate, sodium hexadecyl sulfate, sodium octadecyl sulfate and combinations thereof.

4. The method of claim 1, wherein said aqueous amphipathic alkyl sulfate solution also contains from about 0.05 percent to about 0.5 percent by weight of a sodium orthosilicate.

5. The method of claim 1, further comprising the step of separating said detackified paint from said aqueous amphipathic alkyl sulfate solution after step (c).

6. The method of claim 1, wherein said aqueous amphipathic alkyl sulfate solution further includes from about 0.01 percent to about 0.001 percent by weight of a water conditioner selected from the group consisting of sodium tripolyphosphate, tribasic sodium phosphate and anhydrous sodium metasilicate to precipitate aluminum out of solution.

7. The method of claim 3, wherein said aqueous amphipathic alkyl sulfate solution further includes from about 0.01 percent to about 0.001 percent by weight of a water conditioner selected from the group consisting of sodium tripolyphosphate, tribasic sodium phosphate and anhydrous sodium metasilicate to precipitate aluminum out of solution.

8. The method of claim 4, wherein said aqueous amphipathic alkyl sulfate solution further includes from about 0.01 percent to about 0.001 percent by weight of a water softener selected from the group consisting of sodium tripolyphosphate, tribasic sodium phosphate and anhydrous sodium metasilicate to precipitate aluminum out of solution.

9. The method of claim 1, further comprising the step of controlling the excessive foaming of said circulating amphipathic alkyl sulfate solution with a suitable defoaming composition.

10. A composition for detackifying uncured, solvent-based, thermosetting paint, which comprises an aqueous solution containing from about 0.01 percent to about 30 percent by weight of an amphipathic alkyl sulfate having from about eight to about eighteen carbon atoms, from about 0.1 to about 0.6 percent by weight ammonium alum and from about 0.1 to about 0.6 percent by weight potassium bicarbonate.

11. The composition of claim 10, further containing from about 0.1 percent to about 1 percent by weight sodium bicarbonate.

12. The composition of claim 10, further containing from about 0.05 percent to about 0.5 percent by weight sodium orthosilicate.

13. The composition of claim 11, further containing from about 0.01 percent to about 0.001 percent by weight of a water conditioner selected from the group consisting of sodium tripolyphosphate, tribasic sodium phosphate and anhydrous sodium metasilicate to precipitate aluminum out of solution.

14. The composition of claim 10, further containing from about 0.01 percent to about 0.001 percent by weight of a water conditioner selected from the group consisting of sodium tripolyphosphate, tribasic sodium phosphate and anhydrous sodium metasilicate to precipitate aluminum out of solution.

15. The composition of claim 12, further containing from about 0.01 percent to about 0.001 percent by weight of a water conditioner selected from the group consisting of sodium tripolyphosphate, tribasic sodium phosphate and anhydrous sodium metasilicate to precipitate aluminum out of solution.

* * * * *